Patented July 7, 1931

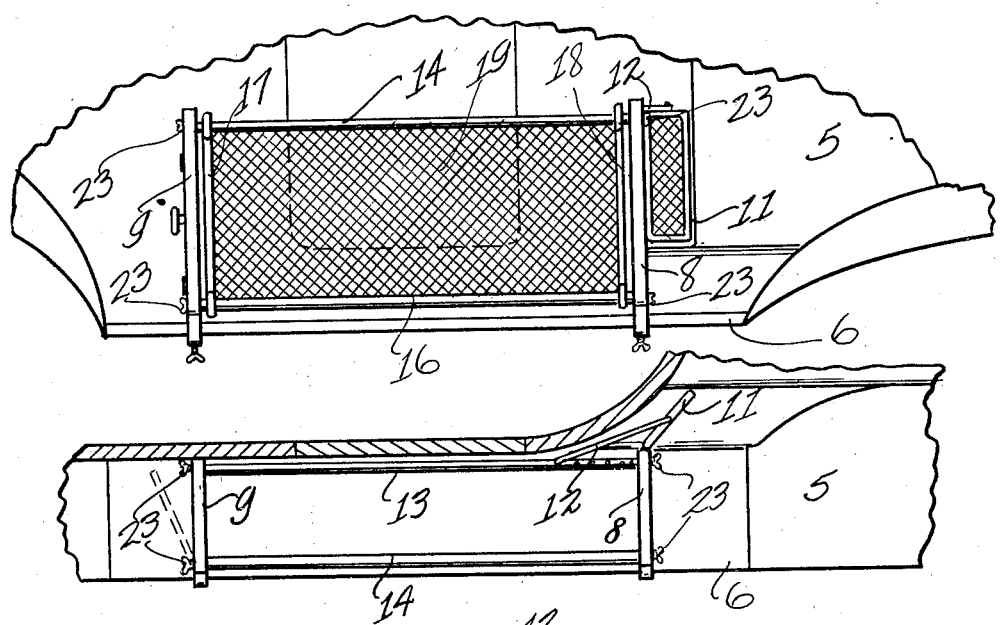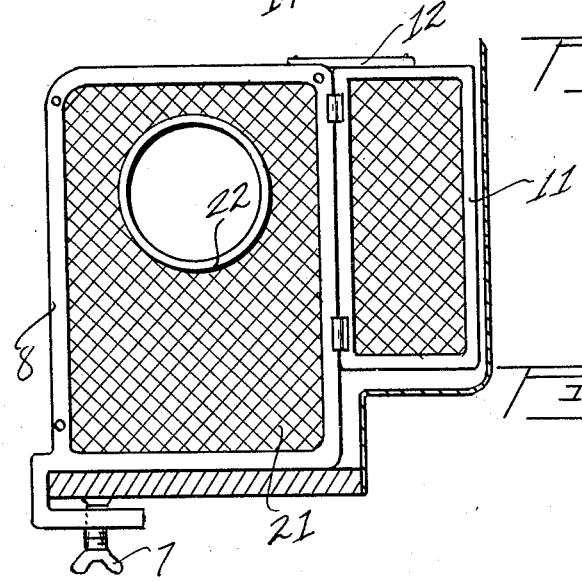

1,813,458

UNITED STATES PATENT OFFICE

AUGUST MEURER, OF SAN BRUNO, CALIFORNIA

DOG CARRIER

Application filed October 4, 1929. Serial No. 397,423.

This invention relates to improvements in dog carriers.

The principal object of the invention is to provide a device to be attached to the running board of a motor vehicle for the purpose of placing a dog therein and to protect the dog against accident.

Another object is to produce a device which may be dismounted and so folded as to occupy a minimum amount of space.

A further object is to produce a device which is economical to manufacture.

A still further object is to produce a device wherein the same may be made into various sizes by merely lengthening three rods and the screen attached thereto.

Other objects and advantages will be apparent during the course of the following description.

In the accompanying drawings forming a part of this specification and in which like numerals are employed to designate like parts throughout the same, Figure I is a side elevation of my device as the same appears when attached to the running board of a motor vehicle, Figure II is a top plan view of Figure I with the cover removed, and Figure III is an enlarged detail end view of the forward end of the device.

In use my device is attached to the running board of a motor vehicle so that the animal placed therein will be protected from accidental falling from the running board. Further I have provided means whereby the animal may project its head out of the retainer if desired. I have further provided a simple means whereby the animal may enter the device and through this novel arrangement the animal may be thoroughly protected in rainy weather by covering the device as a whole with a protecting booth.

In the accompanying drawings wherein for the purpose of illustration is shown a preferred embodiment of my invention, the numeral 5 designates a portion of the motor vehicle having a running board 6. To this running board I attach through the medium of thumb nuts 7 end pieces 8 and 9. These end pieces will be hereinafter referred to as front end pieces and rear end pieces. The front end piece preferably has a hinged portion 11 secured thereto and adjustable through the medium of a brace 12. This hinged portion closes the opening through which the animal could escape where the body swings away from the running board toward the engine hood. This is illustrated in Figure II.

The rear end portion 9 is provided with a door through which the animal may be admitted to the device. This door is of any convenient form and is secured in the rear end frame in any convenient manner. The front and rear end frames 8 and 9 are connected together through the medium of cross rods 13, 14 and 16. Extending between the rods 14 and 16 are supplemental braces 17 and 18. These braces slip upon the ends of the rods 14 and 16 and assist in stretching the screen 19. This screen 19 may be attached to the rods 14 and 16 in any convenient manner as well as to the rods 17 and 18. Similar screening is shown at 21 in the end frame and a ring 22 is inserted therein which permits the animal to project its head out of the retaining device when the animal so desires.

The result of this construction is that by removing the wing nuts 23 from the ends of the rods 13, 14 and 16, the front and rear frames may be slipped over the rods as well as the cross braces 17 and 18, thus permitting the whole device to be assembled quickly and attached to the running board. The top of the device may be either left open or may be covered by a suitable cover at the discretion of the user and during rainy weather a suitable water proof booth may be placed over the entire device thus protecting the animal from rain. Even the opening 22 may be covered with the booth and a celluloid window included in the booth to permit light for the animal.

It is to be understood that the form of my invention herewith shown and described is to be taken as a preferred example of the same and that various changes relative to the material, size, shape and arrangements of parts may be resorted to without departing from the spirit of the invention or the scope of the subjoined claim.

Having thus described my invention, I claim:—

A retaining device for attachment to the frame of a vehicle consisting of a pair of end brackets having a fabric stretched thereon, one of said brackets having a head hole formed therein, a supplemental bracket forming a closure between one of said brackets and the body of the vehicle hinged thereto, rods extending between said end brackets, a fabric stretched thereon, and supplemental braces extending between said rods for the purpose specified.

In testimony whereof I affix my signature.

AUGUST MEURER.